June 24, 1958 D. J. McLAUGHLIN ET AL 2,840,440

MAGNETIC RECORDING AND PICKUP SYSTEM

Filed Oct. 7, 1953 3 Sheets-Sheet 1

INVENTORS
DONALD J. MC. LAUGHLIN
FREDERICK R. FLUHR

BY D. C. Snyder
Howard White
ATTORNEYS

MAGNETIC RECORDING AND PICKUP SYSTEM

Filed Oct. 7, 1953 3 Sheets-Sheet 2

INVENTORS
DONALD J. MC LAUGHLIN
FREDERICK R. FLUHR

BY D. B. Snyder
Howard White
ATTORNEYS

INVENTORS
DONALD J. MC LAUGHLIN
FREDERICK R. FLUHR

BY D. C. Snyder
Howard White
ATTORNEYS 2,840,440

MAGNETIC RECORDING AND PICKUP SYSTEM

Donald J. McLaughlin and Frederick R. Fluhr, Washington, D. C.

Application October 7, 1953, Serial No. 384,804

5 Claims. (Cl. 346—74)

(Granted under Title 35, U. S. Code (1952), sec. 266)

The present invention relates in general to electromagnetic recording and reproduction and more particularly to high speed recording and reproduction of information in a manner useful in general purpose electronic digital computers.

Among the objects of the invention are the following: to improve the resolution in electromagnetic recording and reproduction of information in general, to obtain increased speed of recording and reproduction without effective wear or depletion of the record, to reduce the amount of signal energy or driving force necessary for effective recording, to increase the efficiency of utilization of magnetism stored in the record, and to improve the storage capacity such as the number of storage cells for the storage of information for digital computers.

Various other objects and advantages of the invention will become apparent from a perusal of the following specification and the drawings accompanying the same.

Figure 3:
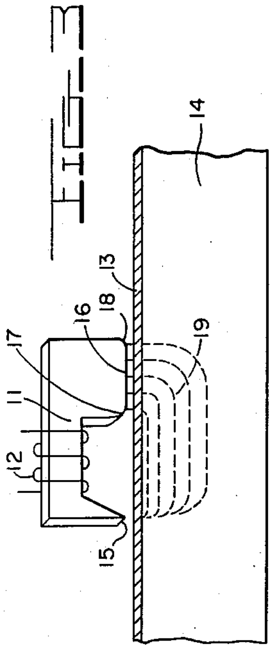
Fig. 3 is a diagrammatic perspective view, about twice actual size showing the core element and magnetic field through it and the record.
Figure 1:
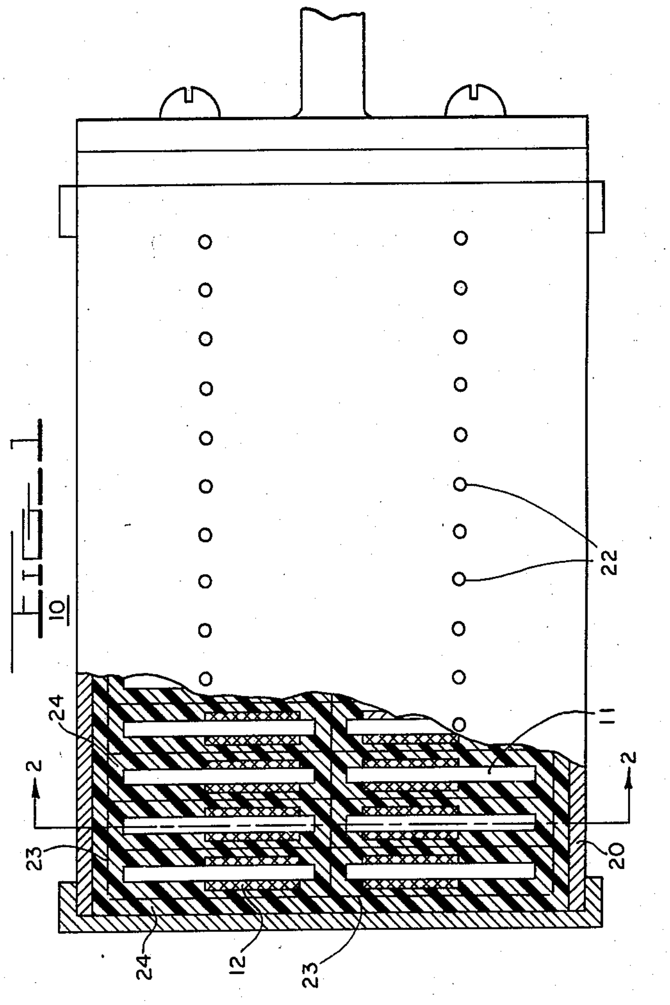
Fig. 1 is a side view partly in section, of a multi-head unit embodying the invention.
Figure 2:
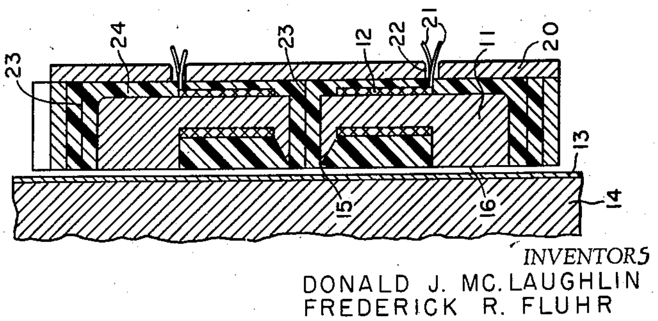
Fig. 2 is a section on the line 2—2 of Fig. 1.

Referring to the drawings in detail and first to Figs. 1 and 2 here is shown on an enlarged scale, about twice actual size, a multi-head unit 10 comprised of a potted group of pairs of recording-reproducing heads each head comprising a core element 11 of novel functional shape, and a signal coil 12 therefore. Distinguishing features of this functional shape will be clear upon reference to Fig. 3 showing the core element in perspective and a portion of a flat surface record element 13 in section in the plane of the near flat side of the core element. This record element is in the form of a thin flat layer or coating 13 of magnetic material of high coercive force and a low permeability such as iron oxide or any known or other suitable substance of like characteristics carried on a support or base element in the form of a disk 14 of magnetic material of low reluctance such as mu metal, and of relatively large cross section. The bipolar core element, of general inverted U-shape, terminates in a pair of widely spaced pole faces 15 and 16, one, the pole face 15 being of knife edge form and therefore of extremely small area while the other 16, is of relatively large flat area of at least 200 times the former, and may be as much as 1,000 times the former according to the narrowness of the edge surface of the small area pole face. The large area pole face 16 lies flat in the plane of termination of the small area pole face 15 so that both may be presented to the flat coated face of the record disk 14 in close proximity thereto with the larger pole face parallel to the record, the pole face 16 having its extreme ends 17 and 18 slightly rounded or flared away from the record disk for a short portion of its length so that the flat face 16 and the record face will lie parallel and in close proximity throughout the greater portion of their overlapping areas. In one embodiment of the invention the clearance between pole faces and record surface is of the order of one two hundredth to one thousandth of an inch. Another distinctive feature of the core element is that the distance between the nearest edges of the two pole faces in several times that of their spacing from the record surface and several times the thickness of the recording layer or coating 13, whereby the reluctance of the magnetic circuit path between the pole pieces exclusive of the disk 14 is rendered relatively high.

The low reluctance base element constituted by the disk 14 together with the large area pole face 16 provides a low reluctance path as indicated by the dotted lines at 19 below the record layer 13. Because of the high reluctance of the path between the pole faces through the relatively long section of record coating bridging the long gap between the pole faces, fringe recording is avoided and the flux between the pole faces is forced substantially wholly through the path 19, traversing the record substantialy perpendicularly at both pole faces.

Here it will be seen that in the case of recording, the recording flux generated by the signal coil 12 is greatly concentrated where it passes through the record at the small pole face 15 and greatly dispersed where it passes through the record at the large area pole face 16. This results in high resolution for a given speed of relative movement between the record and the recording-reproducing head and a high record strength for a given amount of driving energy in the signal coil. It will be noted that due to the large area of uniform air gap at the large pole face any tendency to record variations in the uniformly greatly disbursed and thus relatively low density flux at the large pole face 16 will be negligible, and that in reading or reproducing, even sharply defined magnetized zones in the record film 13 will approach and leave the extreme ends of the large area pole face through gradually shortening and lengthening air gaps for a short distance in approaching and leaving the large area pole face. The small clearance large area gap at the large pole face 16 also results in reduction of reluctance of the magnetic circuit where it passes through the record and the air gap at the large pole face thus, together with the low reluctance path through the base element or disk 14, tending to reduce the total reluctance of the magnetic circuit as a whole with consequent economy in driving force in recording, and efficiency in utilization of recorded magnetic variations.

Because of the extremely small dimension of the small pole face in the direction of relative travel between the head and the record element, satisfactory resolution is obtained in the order of 500 pulses per inch.

Because of the relatively large area of the large pole face 16, in the order of several hundred to two or more thousand times that of the small pole face 15, and the uniformity of its spacing from the record element throughout the major portion of its area, the large pole face has substantialy no recording, reproducing or erasing effect so that in recording or reproducing the small pole piece may lead or trail the large pole piece with equally satisfactory results. This is of special advantage in that it enables the heads to be placed in pairs with the small pole pieces very close together for use in computing systems where writing and reading or reading and additional writing must follow within an extremely short interval of time. To this end and to the end that several record tracks may be close together on a common flat record element, a gang or group of several pairs of heads are mounted as a multi-head unit by potting them with a suitable insulating material in a common holder as shown in Figs. 1 and 2 at 10.

Figs. 1 and 2 are drawn on a scale of about twice actual size and show the multi-head unit as consisting of a plurality of pairs of heads and their signal coils potted in a common casing or head holder 20, with terminal wires 21 for the coils extending out through apertures 22 in the back wall of the casing for connection with suitable circuitry not shown. Potted along with the group of heads are shielding elements 23 of thin sheet low reluctance magnetic material such as "mu" metal forming a surrounding magnetic shield for each head. This magnetic shielding material may be very thin, of the order of a few thousandths of an inch and is therefore here shown diagrammatically as a single line 23. Its purpose is simply to absorb any slight magnetic leakage from the heads. The potting material 24 may be any suitable moldable insulating material such as polymethyl methacrylate. There is thus formed in the holder 20, a substantially homogeneous mass of the potting material 24 surrounding and holding the entire group of heads with their shielding cells in the holder as a solid unit and with the pole faces all in a common plane. The bottom surface of the sides of the holder 20 and the mass of potting material are inset slightly away from this plane for the sake of insurance against contact with the record surface when the pole faces are adjusted to least minimum clearance from the record surface 13 which in the present instance may be from one two-hundredth to one thousandth of an inch depending upon precision of construction and degree of elimination of lost motion and vibration.

Figure 4:
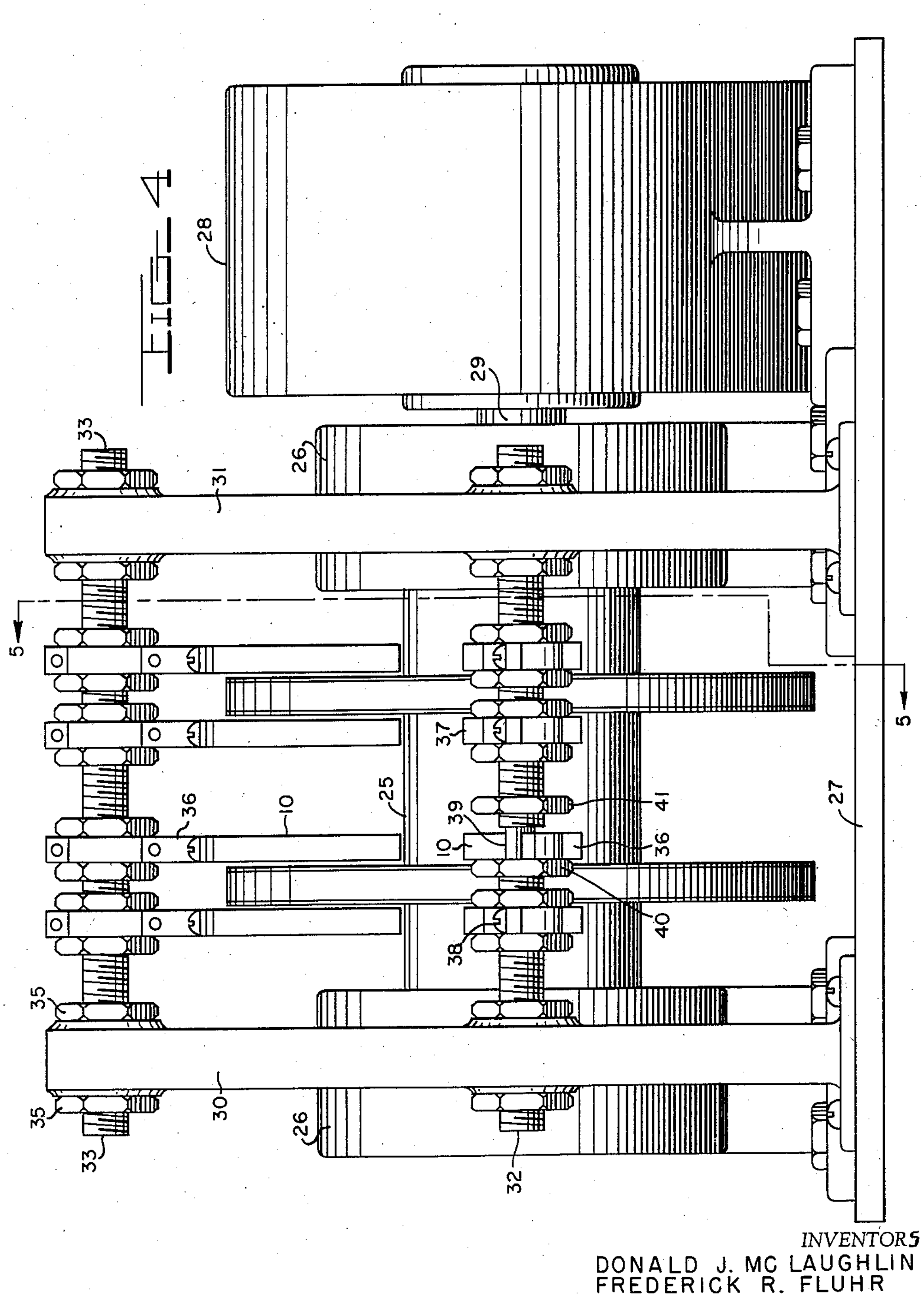
Fig. 4 is a side view of a recording machine structure embodying the invention.
Figure 5:
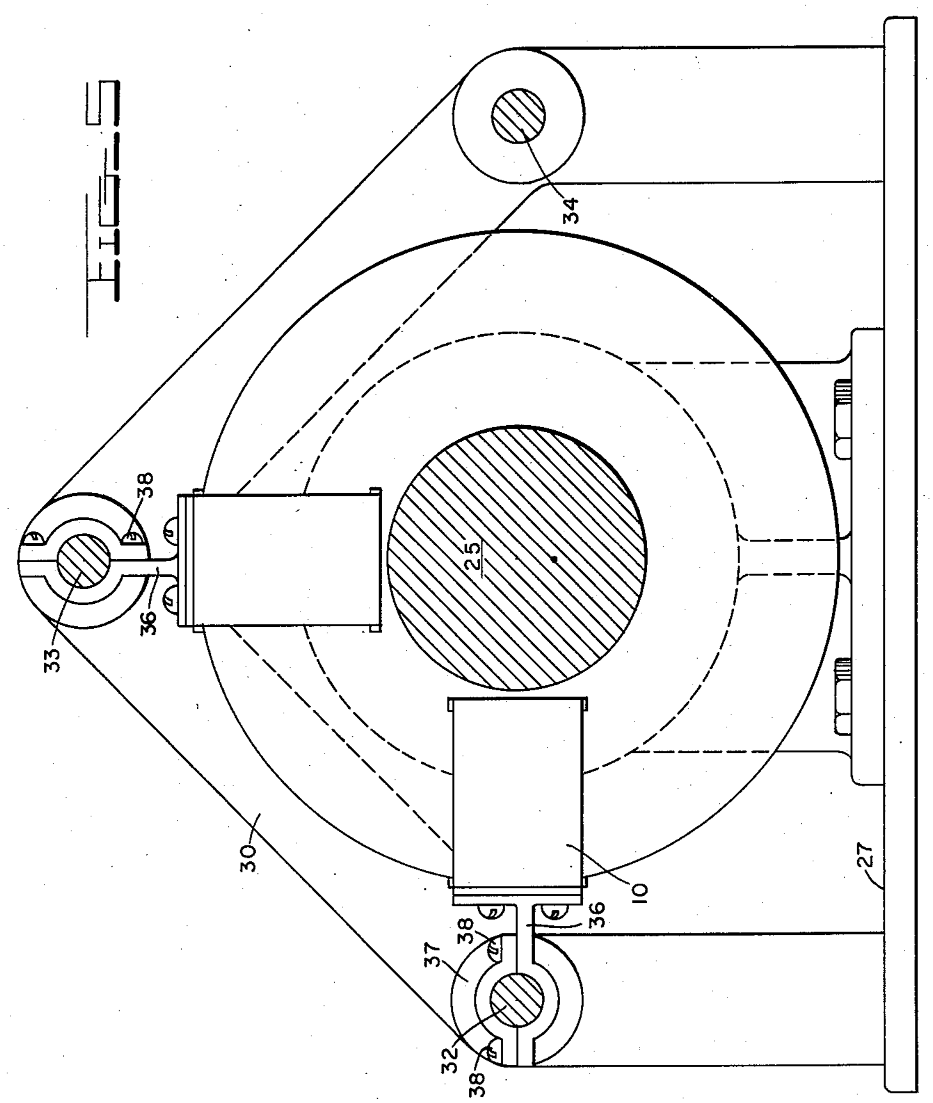
Fig. 5 is a section on the line 5—5 of Fig. 4.

Figs. 4 and 5 drawn on a scale of approximately one-half actual size show a preferred embodiment of the invention constructed with a view to avoidance of lost motion and undue vibration at high lineal velocity of relative motion between the heads and the record elements. As shown here, the record carrying disks 14 coated on both sides with the magnetizable recording layers 13, are carried on and fixed securely and rigidly in any known or other suitable manner to a robust and sturdy shaft element 25 of a diameter in the present instance of about four inches journaled in a pair of sturdy antifriction bearings 26 of any known or other suitable form and of ample proportions mounted on a sturdy base element 27. For driving the shaft 25 at the desired speed an electric motor 28 is mounted on the common base 27 with its shaft 29 coupled to the shaft 25 in alignment therewith in any known or other suitable manner. However other known forms of coupling may be used such as pulleys or gears. Also supported on the common base 27 are a pair of spaced bracket elements 30—31 carrying an array of threaded round rod beams 32, 33 and 34 extending parallel to the axis of the shaft 25. The beams are secured at their ends to the bracket elements by passage through suitable bores in the latter where they are clamped by clamping nuts 35. In the present instance two of the beams 32 and 33 serve not only to complete a rigid frame structure with the elements 30 and 31 but serve also to hold the multi-heads 10 rigidly in the desired operative position relative to the record disk 14. Each multi-head 10 is provided with a supporting clamp arm 36 shaped to fit part way around a beam such as the beam 32 and provided with a clamping cap member 37 arranged to be secured to the arm 36 part way around the beam to clamp the arm to the beam by means of clamping screws 38 in known manner. To enhance this clamping action the threaded beam at locations such as at 39 on beam 32 is turned down to the root of the threads to produce a round unthreaded portion for engagement by the clamp. For axial adjustment of the head along the beam a short distance to and from the surface of its associated disk the unthreaded section is positioned and extended sufficiently beyond the axial width of clamp to permit such adjustment, which may be carried out with meticulous exactitude by proper manipulation of the opposed spacing nuts such as 40—41 threaded on the beam. To further insure a secure holding of the head against rotation about the beam, the portion 39 may be knurled roughened or longitudinally ridged, or the clamp member 36 or cap 37 splined on the beam, all in known manner, not shown.

Referring to Fig. 1, it will be noted that appreciable spacing between the core elements of the heads is necessary in order to allow for the thickness of the signal coils 12 and sufficient spacing to accommodate the shielding elements 23 and some of the potting material 24. This of course necessitates appreciable spacing between the small pole faces of adjacent laterally spaced heads with consequent spacing of the record tracks radially of the record disk. To affect this the intervening spaces on the disk may be used for the record tracks of a second group of heads in a second holder 10′ spaced radially from the axis of the disk to bring the small pole faces of its heads between the tracks of the first group. It will be understood that where the spacing between the small pole faces is sufficient to accommodate two additional tracks a third group holder not shown may be mounted on the beam 34.

In the example here disclosed each disk provides a circular recording band having a radial width of about three inches which, with the small pole faces about one-sixteenth of an inch wide and spaced about three times their width from center to center, will permit the use of three groups of heads on each of the two sides of each disk. With fourteen tracks for each group this would afford 42 tracks on each side or 84 tracks per disk.

While one specific embodiment of the invention has been herein shown and described for the sake of disclosure, it is to be understood that the invention is not limited to such specific embodiment but contemplates all such modifications and variants thereof as fall fairly within the scope of the appended claims.

The invention described herein may be manufactured and used by or for the Government of the United States of America for governmental purposes without the payment of any royalties thereon or therefor.

What is claimed is:

1. In a magnetic recording-reproducing system a relatively thin magnetic record element, said record element being of a magnetic material of high reluctance and high coercive force, a bipolar recording-reproducing electromagnet having both pole faces situated on one side of the record element in close proximity to the adjacent surface of the latter and spaced therefrom not more than one-fiftieth of an inch, said pole faces being spaced apart a distance at least 50 times the thickness of the record element to provide a high reluctance path between the pole faces through the record element, and a low-reluctance base element having a thickness of at least that of the record element, said base element having a face situated on the other side of said record element in direct contact therewith and in overlapping relation to the space between the pole faces.

2. In an electromagnetic recording-reproducing system using a relatively thin recording film of high coercive high reluctance magnetic material, an electromagnetic recording-reproducing head and a bipolar core element therefor of low reluctance material situated wholly on one side of the recording film, means effecting movement of the recording film relative to the said head, and low reluctance means positoned on the other side of the film in direct contact therewith directly opposite the recording head to direct recording and recorded flux perpendicularly through the record film at each pole in shunt of the longitudinally intervening portion of the record film and through the said core element across short air gaps of the order of one two hundredth of an inch at the poles.

3. A high speed magnetic data storage apparatus for computing systems comprising a stationary support, a rigid disk of low reluctance low retentive magnetic material rotatably mounted in the support, record films of magnetizable material of high coercive force carried on opposite sides of the disk in direct contact therewith, means for rotating the disk at a speed in excess of 20 revolutions per second to give a lineal speed of approximately 240 to 620 inches per second between radii of 2 to 5 inches, and a plurality of electromagnetic bipolar recording-reproducing heads fixed relative to said support on opposite sides of the disk within radial distances of 2 to 5 inches from the center of rotation of the disk, each having its two pole faces spaced apart at least 200 times the thickness of the record film, with one of its two pole faces of an area of the order of several hundred times that of the other, both pole faces being spaced within .002 inch from its adjacent record film and parallel thereto throughout the major portion of the overlapping area between the pole faces and the record film.

4. A high speed magnetic data storage apparatus for computing systems comprising a stationary support, a rigid disk of low reluctance, low retentive magnetic material rotatbaly mounted in the support, record films of magnetizable material of high coercive force carried on opposite sides of the disk in direct contact therewith, means for rotating the disk at a speed of 20 revolutions per second to give a lineal speed of aproximately 240 to 620 inches per second between radii of 2 to 5 inches, a pair of bipolar recording-reproducing heads fixed relative to said support each having its two pole faces spaced apart at least 200 times the thickness of the record films and spaced to within .002 inch from an adjacent record film, with one of its two pole faces of an area of the order of several hundred times that of the other, the two small pole faces of the pair being juxtaposed and spaced close together along the path of relative movement between them and the record film during rotation of the disk, whereby in operation writing and reading, and reading and additional writing by the small area pole faces may follow within a very short interval of time.

5. A high speed magnetic data storage apparatus for computing systems comprising a stationary support, a rigid disk of low reluctance, low retentive magnetic material rotatably mounted in the support, record films of magnetizable material of high coercive force carried on opposite sides of the disk in direct contact therewith, means for rotating the disk at a speed of 20 revolutions per second to give a lineal speed of aproximately 240 to 620 inches per second between radii of 2 to 5 inches, a plurality of multi-head units each multi-head consisting of a plurality of recording-reproducing heads and their signal coils potted in a common casing with their pole facing lying in a common plane and mounted on said stationary support with the pole faces spaced to within .002 inch from an adjacent record film and spaced apart radially of the disk to provide space for the signal coils resulting in radially spaced circular recording paths of relative motion between the pole faces and the disk, one of said units being offset radially with respect to another an amount sufficient to bring its pole pieces to lie in paths between those of said other unit.

References Cited in the file of this patent

UNITED STATES PATENTS

| | | |
|---|---|---|
| 2,614,169 | Cohen | Oct. 14, 1952 |
| 2,643,130 | Kornei | June 23, 1953 |
| 2,685,492 | Gabriel | Aug. 3, 1954 |
| 2,714,133 | Barry | July 26, 1955 |
| 2,750,579 | Lekas et al. | June 12, 1956 |

FOREIGN PATENTS

| | | |
|---|---|---|
| 512,766 | Great Britain | Nov. 30, 1937 |